United States Patent [19]

Ohta et al.

[11] Patent Number: 4,796,086
[45] Date of Patent: Jan. 3, 1989

[54] METHOD FOR CONVERTING COLOR PICTURE SIGNALS

[75] Inventors: Noboru Ohta; Koji Takahashi; Tsuneo Suzuki; Makoto Tsugita, all of Minami-Ashigara, Japan

[73] Assignee: Fuji Photo Film Co., Ltd., Kanagawa, Japan

[21] Appl. No.: 802,223

[22] Filed: Nov. 26, 1985

[30] Foreign Application Priority Data

Nov. 30, 1984 [JP] Japan .................. 59-252889
Dec. 19, 1984 [JP] Japan .................. 59-268104
Dec. 19, 1984 [JP] Japan .................. 59-268106

[51] Int. Cl.$^4$ .................................................. H04N 1/46
[52] U.S. Cl. .................................... 358/80; 358/75
[58] Field of Search ................................ 358/80, 75

[56] References Cited

U.S. PATENT DOCUMENTS

| | | | |
|---|---|---|---|
| 4,590,515 | 5/1986 | Wellendorf | 358/80 |
| 4,598,282 | 7/1986 | Pugsley | 358/80 |
| 4,641,267 | 2/1987 | Asai | 358/280 |
| 4,670,780 | 6/1987 | McManus | 358/80 |
| 4,682,216 | 7/1987 | Sasaki | 358/80 |

Primary Examiner—Howard W. Britton
Attorney, Agent, or Firm—Wenderoth, Lind & Ponack

[57] ABSTRACT

A color hard copy of a picture displayed on, for example, a screen of a color television set is obtained by a signal converter in which an inclination of brightness with respect to the saturation of a color of the hard copy is modified by a signal converting circuit so as to be in accord with an inclination of brightness with respect to the saturation of the displayed color picture, a signal level of a signal regarding the specific color designated by a color setter is changed, and the color development density of the specific color element designated by a dye amount setter is also changed, whereby a color hard copy in which the specific color is maximumly corrected can be obtained.

5 Claims, 8 Drawing Sheets

METHOD FOR CONVERTING COLOR PICTURE SIGNALS

BACKGROUND OF THE INVENTION

This invention relates to a method for converting color picture signals regarding a picture image displayed on, for example, a screen of a color television set in which the picture image is reproduced with a highly purified color saturation and precisely in accordance with the changes of the brightness of colors, and a specified color can optionally be changed or modified, when it is required to obtain a hard copy of the picture image on the display unit such as color television set.

Recently, it has been necessary to obtain a hard copy of one scene of a picture displayed on a screen of a cathode ray tube (CRT) of a color television screen to reserve the scene for a long time. In that case, a hard copy is prepared by the color development of dyes of yellow (Y), magenta(M) and cyan(C) of color sensitive material on the basis of signals regarding blue(B), green(G) and red(R) colors of the television screen, respectively.

With one typical method of preparing such hard copy as described above, it has been proposed to firstly determine color development amounts of the yellow dye (Y) on the basis of the signal representing the blue color (B), of the magenta dye (M) based on the green color (G) signal, and of the cyan dye (C) based on the red color (R) signal. In this connection, the graph of FIG. 1 shows the color density with respect to signals inputted, and the graph shows condition of the density in a case where the signal representing the blue color is changed from the zero value (AA-point) to the maximum value (BB-point) with signals representing the green and red colors being maintained as the constant maximum values. The density characteristics Y1 of the yellow color on the basis of the blue color signal changes from the zero value to the maximum value (Dmax), and the density characteristics MC1 of the magenta and cyan colors on the basis of the green and red color signals always maintain the constant maximum value (Dmax). Spectral densities in such case as shown in FIG. 1 will be represented as shown in FIGS. 2A, 2B and 2C, in which FIG. 2A represents a condition at the AA-point shown in FIG. 1. FIG. 2B shows an ideal spectral density at the BB-point, but in actuality, the spectral density as shown in FIG. 2C will be obtained for the reason that the absorption of the blue color to the magenta (M) and cyan (C) dyes is not neglected, i.e. the subabsorption amount of the yellow color component is not zero. Accordingly, it is impossible to obtain a chromatic blue color such as shown on a color television screen.

In addition, a color reformation area of the photosensitive material is generally narrow in comparison with that on the screen of the color television set, so that the image of the color of the hard copy is not often matched with the color image of the television picture image. Moreover, in a conventional picture image outputting system, it is impossible to change or correct only the specified color for responding to the requirement for changing a color of a part of the obtained hard copy because of the unsatisfactory nature of the color of that part. For example, when the magenta color amount in the blue color is changed, the magenta dye, each with the same color amount as that in the blue color, in all colors related to the magenta color are adversely changed. Thus, a sufficient color adjustment cannot be attained in the conventional system for the aimed requirement.

Generally, since the color reappearing area of the photosensitive material is narrow in comparison with the color reappearing area of the screen of the color television set, a color image of the obtained hard copy is often not in accord with the picture image displayed on the television screen. Furthermore, in view of the produced hard copy, it is impossible for the conventional picture image outputting device or system to change or modify the specific color(s) with respect to a requirement for changing or modifying the color(s) of the specific portion(s). For example, even when it is necessary to modify the magenta dye amount in the blue color, the magenta dye amounts of all colors relating to the magenta are changed with the same amounts as that in the blue color, and accordingly, the color adjustment satisfying the aimed requirement cannot be achieved.

SUMMARY OF THE INVENTION

An object of this invention is to eliminate defects or drawbacks in the prior art and to provide an improved picture image output method for obtaining a colored hard copy of a picture displayed on, for example, a screen of a color television set capable of precisely reproducing the color saturation of the picture displayed on a display unit and/or of changing or modifying only a specifically designated color or dye amount.

This and other object would be achieved by providing a method for converting color picture signals regarding a displayed color picture according to this invention, and the method comprises the steps of preparing a signal conversion system comprising a specific color setting element, a specific dye amount setting element, and circuit means for converting input signals regarding a displayed color picture in a case where a color reproducing area of the displayed color picture is different from that of a color hard copy to be obtained, modifying an inclination of brightness with respect to the chroma of a color of the color hard copy so as to be in accord with an inclination of brightness with respect to the chroma of a color of the displayed color picture by the signal converting circuit means, and changing a signal level regarding the specific color setting element and changing the color development density of the specific dye designated by the dye amount setting element, so as to thereby maximumly correct the specific color.

The nature, principle and utility of the invention will become more apparent from the following detailed description when read in conjunction with the accompanying drawings.

BRIEF DESCRIPTION OF THE DRAWINGS

In the accompanying drawings.

DESCRIPTION OF THE PREFERRED EMBODIMENTS

Figure 1:
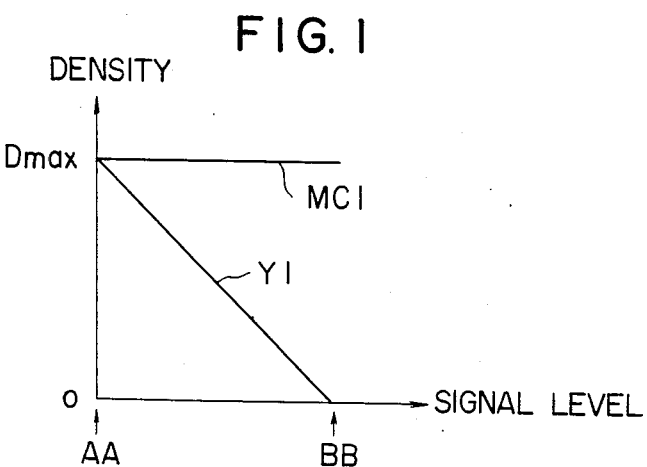
FIG. 1 is a graph representing a relationship between a signal level and a density of a dye.
Figure 2A:
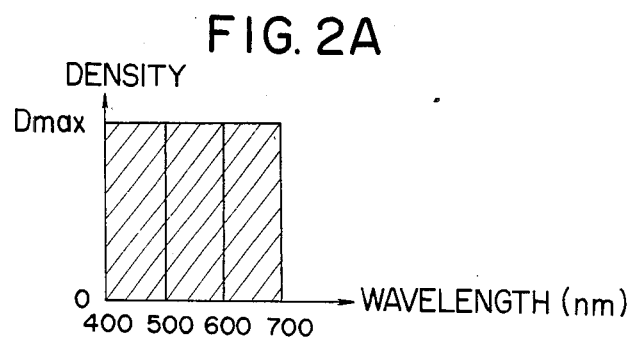
FIGS. 2A through 2C are graphs showing spectral density characteristics in connection to FIG. 1.
Figure 2B:
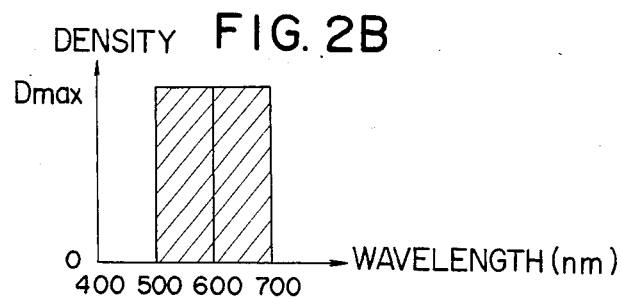
Figure 2C:
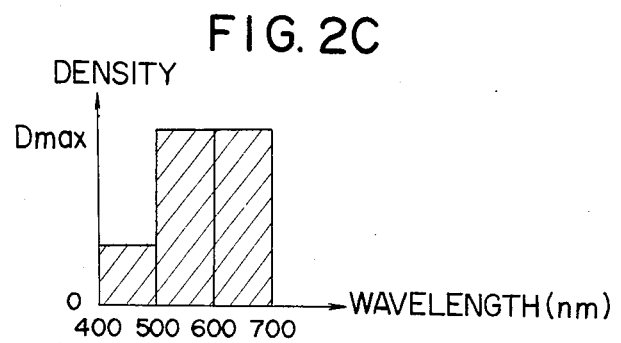
Figure 3:
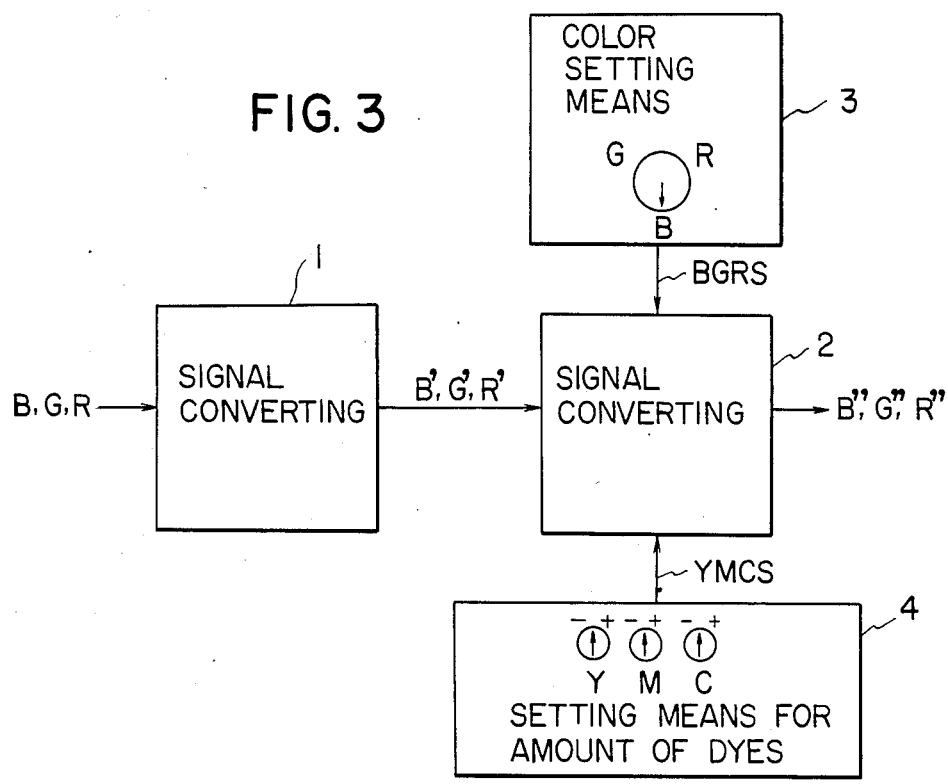
FIG. 3 shows a diagram of a signal conversion system for explaining the principle of the method of this invention.

FIG. 3 shows a brief block diagram for explaining the basic principle for this invention, in which signals B, G and R representing quantized three colors i.e. blue, green and red displayed on the television screen are inputted into the first signal converting circuit 1 in which the signals are converted into signals B', G' and R' for acurately reproducing colors of the television screen for the requirement of obtaining a hard copy of the picture image on the color television screen with a photo-sensitive material. The signals B', G' and R' are then inputted into the second signal converting circuit 2 into which a signal BGRS from a color setting means 3 for designating a color which is to be changed maximumly and a signal YMCS from a dye amount setting means 4 for designating a dye amount which is to be changed are inputted preliminarly. The second signal converting circuit 2 operates to change the specified dye amount of the specified color in accordance with the signal BGRS and YMCS and convert these signals into signals B", G" and R" which are then outputted therefrom. On the basis of the output signals B", G" and R", a required hard copy is obtained by the color development of dyes of the respective colors Y, M and C. The dye amount setting means 4 generally comprises adjustment dials, which operate to modify or change the dye amounts regarding the dye Y, M and C by rotating the dials in "+" or "−" direction as shown in FIG. 3.

Figure 4:
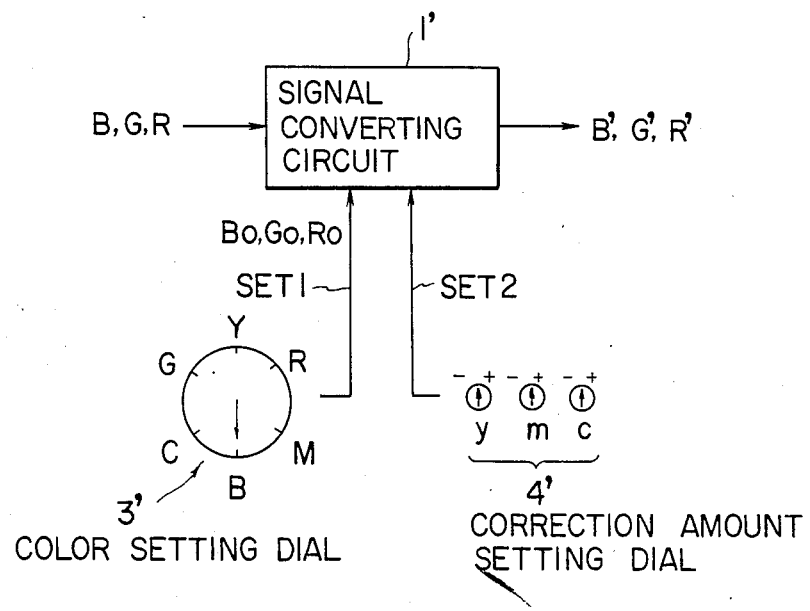
FIG. 4 shows a diagram of another mode of a signal conversion system similar to that shown in FIG. 3.

FIG. 4 also shows a brief block diagram similar to that shown in FIG. 3, in which a color setting dial 3' and a correction amount setting dial 4' are utilized as the color setting means 3 and the dye amount setting means 4 shown in FIG. 3. Referring to FIG. 4, the color setting dial 3' are scaled by B, G, R and Y, M, C, which respectively represent blue, green, red colors and yellow, magenta, cyan dyes and by adjusting the color setting djal 3' to the required scale such as "B" as shown by an arrow in FIG. 4, a signal SET1 representing the designated color is inputted into a signal converting circuit 1'. The correction amount setting dial 4' includes three dials y, m and c corresponding three principle colors and when it is required to change the color development density of any one of dyes, a dial corresponding to that dye may be operated in a direction "+" or "−" as shown in FIG. 4. In accordance with the handling of the dial y(m or c), a signal SET2 representing the designated correction amount is transmitted to the signal converting circuit 1' so as to thereby output a signal B'(G' or R') regarding the designated specified color.

Now back to the example of FIG. 3, the signal conversion theory in the first signal converting circuit 1 will first be described hereunder in detail.

Figure 7:
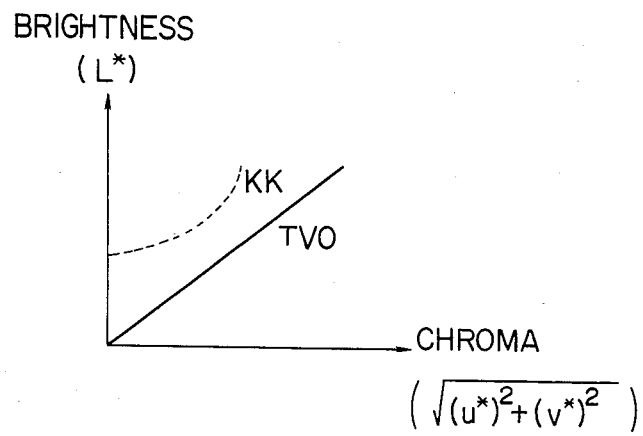
FIGS. 7 and 8 are graphs representing the relationship between the brightness and the chroma of the color.
Figure 8:
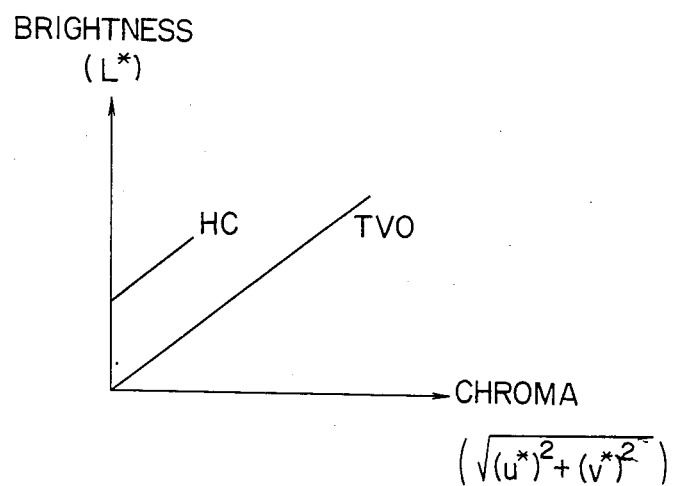
Figure 9:
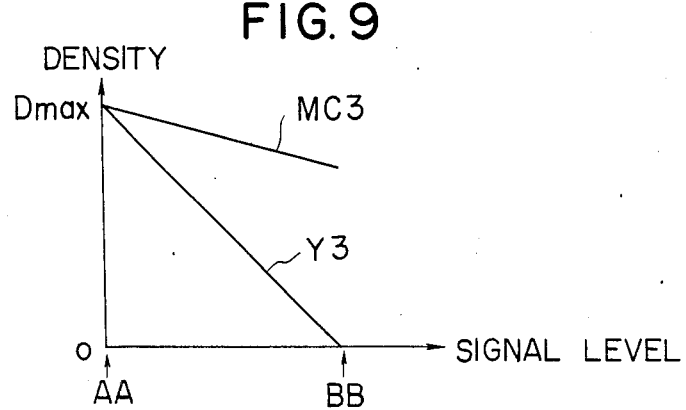
FIG. 9 is a graph representing the relationship between the signal level and the converted density of a dye according to this invention.

Referring to FIG. 7, the relationship between the chroma "$\sqrt{(u^*)^2+(v^*)^2}$" prescribed by "CIE 1976 L*u*v*" and the brightness "L*" is designated by a solid line TV0 with respect to a picture image displayed on a television screen and by a broken line KK with respect to a photosensitive material generally used for obtaining a hard copy. As will be understood from the graph of FIG. 7, the color reproducing area of the photosensitive material is narrower than that of the picture on the television screen, and moreover, the characteristic feature of the former is different from the latter. With this fact, the chroma and the brightness of the color are not acurately displayed only by developing the YMC dyes of the photosensitive material in accordance with the signal from the color television set when a hard copy of the picture on the color television screen is obtained with the photosensitive material. In order to eliminate this problem, it is required to adjust the inclination of the picture characteristic curve of the hard copy so as to substantially accord with the inclination of the characteristic line TV0 of the color television picture such as shown by a line HC in FIG. 8, and concretely, it is preferable that the inclination of the line HC is approximately 1.0~1.6 times of that of the line TV0. An actual method for obtaining such a characteristic line HC as shown in FIG. 8 will be explained with reference to FIG. 9, which represents the color development amounts of the yellow (Y), magenta (M) and cyan (C). The graph in FIG. 9 shows the fact that the dye amount of the yellow may be changed as a line Y3 and the dye amount of the magenta and the cyan may be changed as a line MC3 with respect to the picture signal representing the fact that the blue color is changed from zero to the maximum value and the green and red colors maintain the lowest values. In other words, regarding the yellow, it is determined that the density is changed from zero to the maximum value Dmax with respect to the signal level change from the AA-point (zero) to the BB-point (maximum value), and regarding the magenta and the cyan, it is determined that the density is somewhat lowered, and not a constant maximum value, with respect to the signal level change. According to this manner, the blue color acurately reproducing the brightness with the highly purified chroma can be realized.

The signal conversion based on the aforementioned principle will be achieved in accordance with the following equations (1) by providing that the quantized level of the maximum signal of the signals regarding three colors to be inputted is made equal to $X_0$:

$$\left. \begin{array}{l} B' = X_0 + FB \times (B - X_0) \\ G' = X_0 + FG \times (G - X_0) \\ R' = X_0 + FR \times (R - X_0) \end{array} \right\} \quad (1)$$

wherein letters FB, FG and FR are coefficients for prescribing the density of the highest saturation color and are optionally determined to be positive values of 1 or less than 1.

Figure 5:
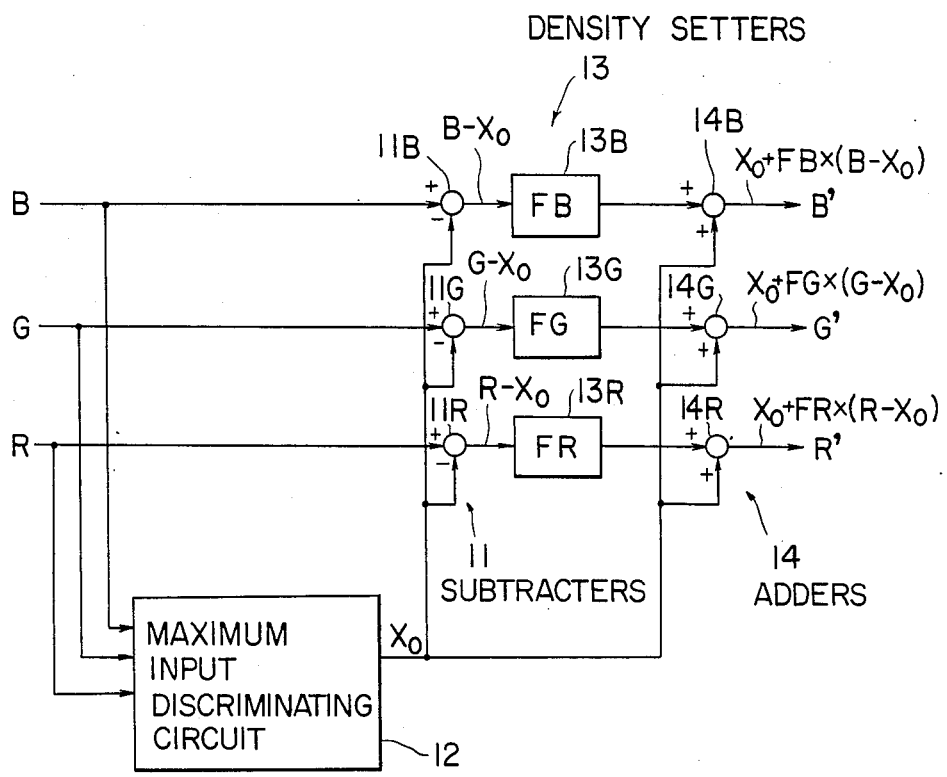
FIG. 5 is a block diagram showing a concrete construction of a first signal converting circuit arranged in the system shown in FIG. 3.

FIG. 5 shows a block diagram revealing the concrete construction of the first signal converting circuit 1, in which the signals B, G and R, representing the quantized picture to be inputted, are inputted into subtracters 11(11B, 11G and 11R) and a maximum input discriminating circuit 12, respectively. The signals B, G and R discriminated in the maximum input discriminating circuit 12 are then transmitted into the subtracters 11B, 11G and 11R as the maximum input signal $X_0$. The signals $B-X_0$, $G-X_0$ and $R-X_0$ subtracted in the respective subtracters 11 are inputted into density setters 13(13B, 13G and 13R), into which the aforementioned coefficients FB, FG and FR are multiplied, respectively, and the multiplied products are then fed into adders 14(14B, 14G and 14R), into which the products are added to the maximum input signal $X_0$ transmitted from the maximum input discriminating circuit 12. In this manner, the converted output signals B', G' and R' are outputted from the respective adders 14, whereby the equations (1) are satisfied and the signals B', G' and R' regarding the converted colors can be obtained.

The principle for the signal conversion achieved in the second signal converting circuit 2 will be explained hereunder.

When the color setting means 3 is first adjusted to the designated color, a signal having a level corresponding to the designated color with its most saturated degree is inputted into the second signal converting circuit 2, and the contents of the designated color signals BGRS are now referred to as $B_0$, $G_0$ and $R_0$, respectively. In a similar manner, the signals YMCS representing the designated dye amounts transmitted from the dye amount setting means 4 are also inputted into the second signal converting circuit 2, and the contents of the designated signals YMCS are now referred to as $\alpha y$, $\alpha m$ and $\alpha c$, respectively. The output signals B'', G'' and R'' obtained by converting the signals B', G' and R' will be expressed as follows, in which a character "$\beta$" represents a value prescribing a color area to which a color correction or modification is to be applied.

$$\left.\begin{aligned}
B'' &= B' + \alpha y \times \\
&\quad \{\beta - (|B' - B_0| + |G' - G_0| + |R' - R_0|)\} \\
G'' &= G' + \alpha m \times \\
&\quad \{\beta - (|B' - B_0| + |G' - G_0| + |R' - R_0|)\} \\
R'' &= R' + \alpha c \times \\
&\quad \{\beta - (|B' - B_0| + |G' - G_0| + |R' - R_0|)\}
\end{aligned}\right\} \quad (2)$$

In the above equation, if a value between a bracket { } becomes negative, the value is treated as zero. The value $\beta$ can optionally be selected with a positive integer equal to or less than the number subtracting "1" from the quantized numbers of the signal. The equation (2) means that the intensity to be converted is changed by the difference between the input signal and the specifically designated signal and by the designated dye amount and also means that a certain limitation is applied to the color area to be corrected or modified.

Figure 6:
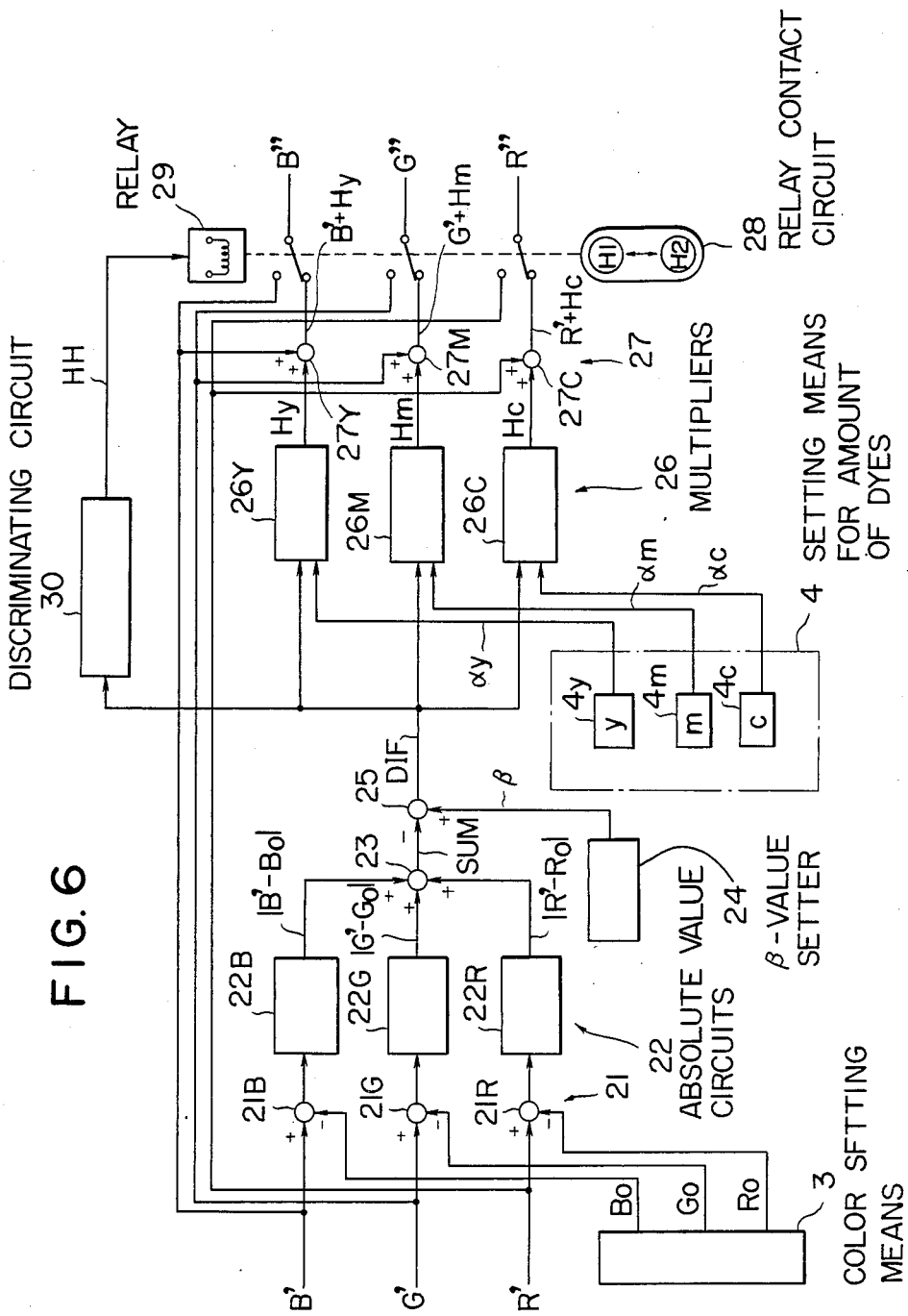
FIG. 6 is a block diagram also showing a concrete construction of a second signal converting circuit arranged in the system shown in FIG. 3.

The block diagram represented by FIG. 6 shows one concrete example of the second signal converting circuit 2. Referring to this block diagram, the input signals B', G' and R' are inputted into the subtracters 21(21B, 21G and 21R) together with the color signals $B_0$, $G_0$ and $R_0$ designated by the color setting means 3, and both the signals B', G', R' and $B_0$, $G_0$, $R_0$ are then subjected to the subtraction operations and the operated results are thereafter inputted into absolute value circuits 22(22B, 22G, and 22R) which obtain absolute values therein. The signals regarding the absolute values $|B'-B_0|$, $|G'-G_0|$ and $|R'-R_0|$ are then transmitted into an adder 23, respectively, and the added result is outputted as an absolute value sum signal SUM, which is then inputted into a subtracter 25 together with a $\beta$ signal set in a $\beta$-value setter 24. In the subtracter 25, the subtracting operation is performed so as to thereby output a difference signal DIF therefrom. The difference signal DIF is then inputted into multipliers 26(26Y, 26M and 26C) together with color element signals $\alpha y$, $\alpha m$ and $\alpha c$ set by setters 4y, 4m and 4c in the dye amount setting means 4, respectively, setting the dyes y, m and c. The multiplied results are transmitted as multiplied signals Hy, Hm and Hc from the multipliers 26 and inputted into adders 27 (27Y, 27M and 27C) together with the input signals B', G' and R', and the added results are then inputted into a relay contact circuit 28 as conversion signals (B'+Hy), (G'+Hm) and (R'+Hc), respectively. The difference signal DIF from the subtractor 25 is also inputted into a discriminating circuit 30 for discriminating the fact as to whether the difference is a positive value or a negative value, and if the discrimination of the signal DIF represents the negative value, a negative signal HH is outputted to thereby energize a relay 29. Upon the energization of the relay 29, the relay contact circuit 28 is connected to an H1-side and the input signals B', G' and R' are outputted as they are as the converted signals B'', G'' and R''. On the other hand, in case the discrimination of the signal DIF represents a positive value, the relay 29 is not energized and the relay contact circuit 28 maintains the connection with an H2-side. Accordingly, the signals (B'+Hy), (G'+Hm) and (R'+Hc) are transmitted as the converted output signals B'', G'' and R'', respectively.

The operations or processings described above will be explained hereunder in use of concrete numerical values.

Figure 10:
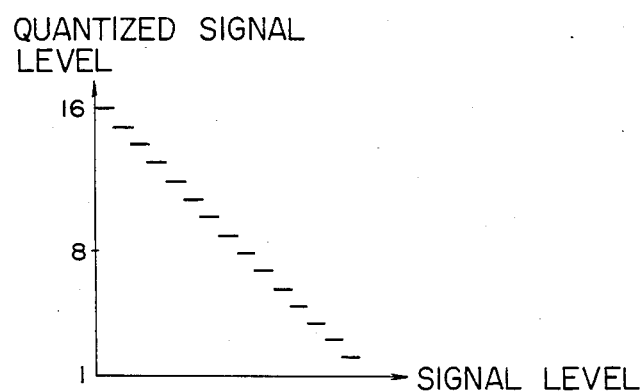
FIG. 10 is a graph showing the relationship between the input signal level and the quantized signal level.
Figure 11:
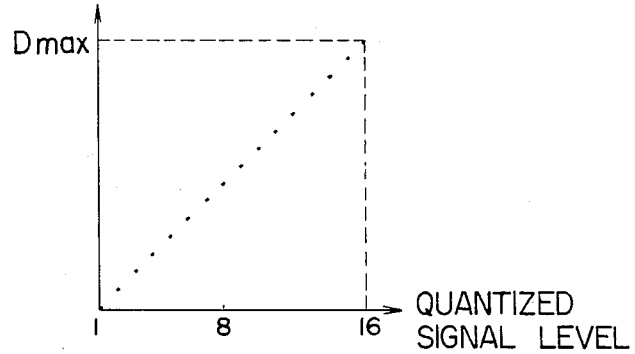
FIG. 11 is a graph showing analyzed density for converting the quantized signal to the color development density.

It is first supposed that the input signals B', G' and R' are quantized into sixteen (16) stages (4 bits, maximum level "1" and minimum level "16") as shown in FIG. 10. In this case, as shown in FIG. 11, the maximum densities of the Y, M and C to be converted in accordance with the quantized signal levels are combined as a line showing the maximum value Dmax, and a density table regarding the densities of the Y, M and C with respect to the quantized signal levels for obtaining a hard copy is preliminarily prepared. After the signal conversion, the dyes of the Y, M and C are respectively developed on the basis of the density table to thereby obtain the hard copy. This density table can obtain an achromatic color, and the brightness of the achromatic color is uniformly divided with the brightness function.

Now supposing that the color provided with most saturated color element of blue is inputted, the signals B, G and R will be expressed as follows.

$$B = 1 \\ G = 16 \\ R = 16 \quad (3)$$

In this case, the quantized color $X_0$ of the maximum signal equals to "1" in consideration of the signal conversion in the first signal converting circuit 1, and the values FB, FG and FR will be set to "13/15". When these values are applied to the equation (1) described above, the following result (4) will be obtained.

$$B' = 1 + 13/15 \cdot (1 - 1) = 1 \\ G' = 1 + 13/15 \cdot (16 - 1) = 14 \\ R' = 1 + 13/15 \cdot (16 - 1) = 14 \quad (4)$$

As is understood from this result (4), the signal value $B'$ regarding the blue color maintains the original input value, and the signal values $G'$ and $R'$ regarding the green and red colors are converted to values smaller than the input values thereof (actual signal levels are converted as high values).

In consideration of the signal conversion in the second signal converting circuit 2, in case it is now supposed that the blue color is designated by the color setting means 3 and the magenta amount is to be reduced to "2/15", for example, by the dye amount designation means 4, the following respective value will be obtained as a result (5).

$$ay = 0, am = -2/15, ac = 0 \\ B_0 = 1, G_0 = 16, R_0 = 16 \\ B' = 1, G' = 14, R' = 14 \quad (5)$$

Now then supposing that the $\beta$-value is set to "15" and these values are applied to the equation (1), output values $B_1''$, $G_1''$ and $R_1''$ of the converted signal coutput $B''$, $G''$ and $R''$ will be calculated as follows, respectively as a result (6).

$$B_1'' = 1 + 0 = 1 \\ G_1'' = 14 - 2/15 \cdot \{15 - (|1 - 1| + |14 - 16| + |14 - 16|)\} \approx 12.5 \\ R_1'' = 14 - 0 = 14 \quad (6)$$

In case it is also supposed that the density of the magenta is further diminished and the value of $am$ is set to "$-4/15$" and "$-6/15$", the equation (2) will be calculated as follows, in which $B_2''$, $G_2''$, $R_2''$ and $B_3''$, $G_3''$, $R_3''$ are set as output values of the converted signal inputs $B''$, $G''$, $R''$, correspondingly, respectively, as results (7) and (8).

$$B_2'' = 1 + 0 = 1 \\ G_2'' = 14 - 4/15 \cdot \{15 - (|1 - 1| + |14 - 16| + |14 - 16|)\} \approx 11 \\ R_2'' = 14 - 0 = 14 \quad (7)$$

$$B_3'' = 1 + 0 = 1 \\ G_3'' = 14 - 6/15 \cdot \{15 - (|1 - 1| + |14 - 16| + |14 - 16|)\} \approx 9.5 \\ R_3'' = 14 - 0 = 14 \quad (8)$$

Figure 12:
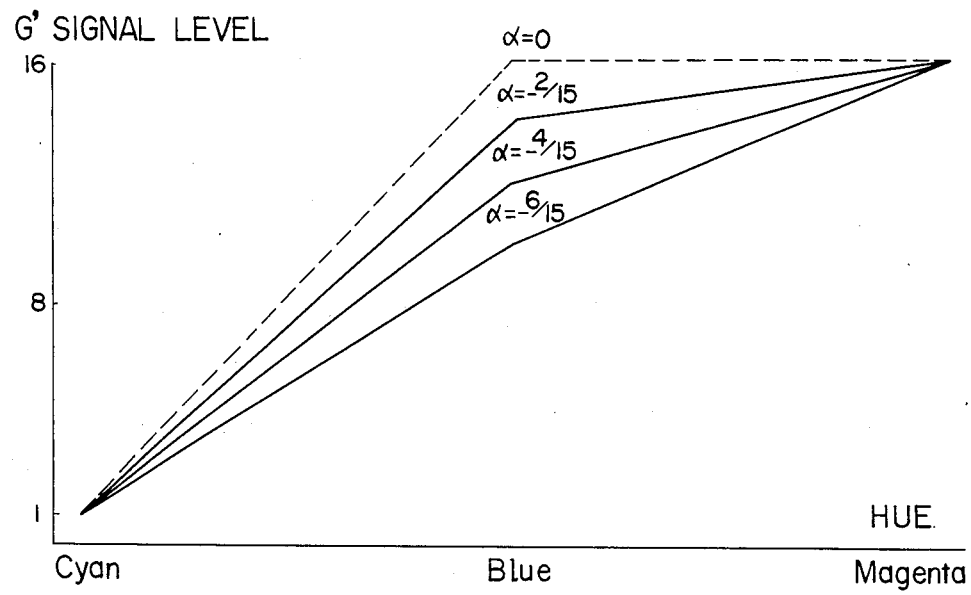
FIG. 12 is a graph showing changes of signal levels of the blue color after signal conversion in various cases.
Figure 13:
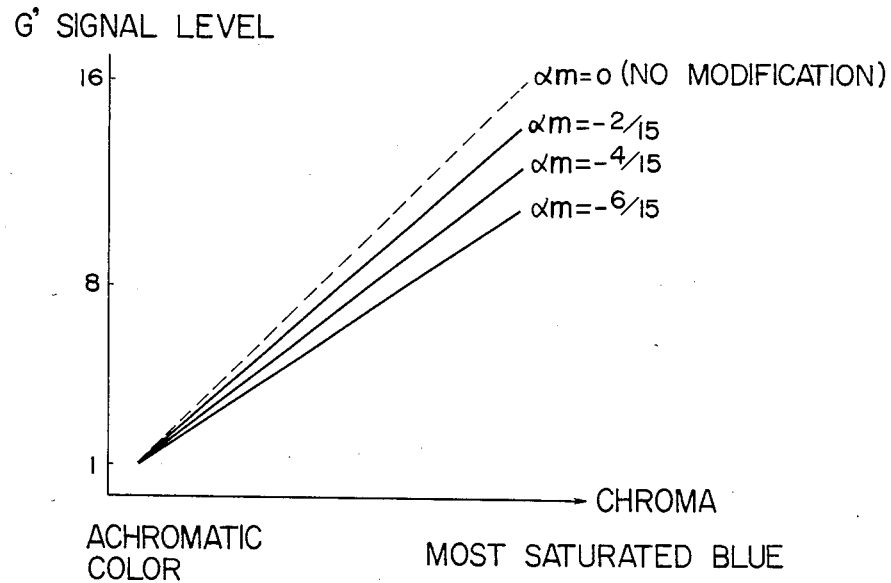
FIG. 13 is a graph showing the change of the output signal level with respect to the change of the chroma of the blue color.

The results mentioned hereinbefore will be represented by FIGS. 12 and 13. The graph of FIG. 12 shows the relationship between the color hue change of the input signal and the signal level modification or shows the result of changing the modified amount ($\alpha$) in a case where the magenta amount of the blue color is changed. The graph shows the fact that when the blue color is maximally changed and the color hue is then changed, the change of the signal level becomes slow (in which since the case of $\alpha = 0$ shows no midification, the difference from the case ($\alpha = 0$) shows the actually changed amount).

The graph of FIG. 13 shows the relationship between the change of the chroma to the input signal and the modification amount of the signal, or shows the result of changing the modified amount ($\alpha$) also in a case where the magenta amount of the blue color is changed. This graph shows the fact that when the most saturated blue color is maximally changed and the chroma is then reduced, the signal level change becomes slow.

In the embodiment described hereinbefore, although the signal conversion methods are explained on the basis of the equations (1) and (2), since the signal converting principle in the first signal converting circuit resides in the setting of the inclination of the brightness with respect to the chroma, another means which can realize the principle would be utilized without limiting the signal converting method to the equation (1). In the similar meaning, the signal comverting principle in the second signal converting circuit resides in obtaining a colored hard copy with the desired color saturation by means of the color designation means and/or dye amount setting means, so that several methods other then that based on the equation (2) would be utilized, and for example, the signal conversion vould be realized on the basis of the following equations (9) and (10);

$$B' = B + ay \times \exp\left(-\frac{(|B - B_0| + |G - G_0| + |R - R_0|)}{\gamma}\right) \\ G' = G + am \times \exp\left(-\frac{(|B - B_0| + |G - G_0| + |R - R_0|)}{\gamma}\right) \\ R' = R + aC \times \exp\left(-\frac{(|B - B_0| + |G - G_0| + |R - R_0|)}{\gamma}\right) \quad (9)$$

-continued $$B' = B + ay \times [\{\beta - (|B - B_0| + |G - G_0| + |R - R_0|)\}/\beta]^{1/r}]$$
$$G' = G + am \times [\{\beta - (|B - B_0| + |G - G_0| + |R - R_0|)\}/\beta]^{1/r}]$$
$$R' = R + ac \times [\{\beta - (|B - B_0| + |G - G_0| + |R - R_0|)\}/\beta]^{1/r}]$$
(10)

whereby the inclination of the brightness with respect to the chroma of the color can be optionally set by changing the value of "$\gamma$".

The difference in the correction or modification methods based on the equation (2) and the equations (9) and (10) will be briefly explained hereunder.

The changes of the modified amounts in these equations are determined by the values in bracket { } and supposing that the relative modification amount is to be RC ($|B-B_0|+|G-G_0|+|R-R_0|)=\alpha$ in a case where the maximum modified amount is set to the value "1.0", the relative modification amount $RC_1$ in the equation (2) will be represented by $$RC_1 = (\beta - \alpha)/\beta \quad (2)'$$

the relative modification amount $RC_2$ in the equation (9) will be represented by $$RC_2 = e - \alpha/r \quad (9)'$$

and the relative modification amount $RC_3$ in the equation (10) will be represented by $$RC_3 = \{(\beta - \alpha)/\beta\} 1/r \quad (10)'$$

Figure 14:
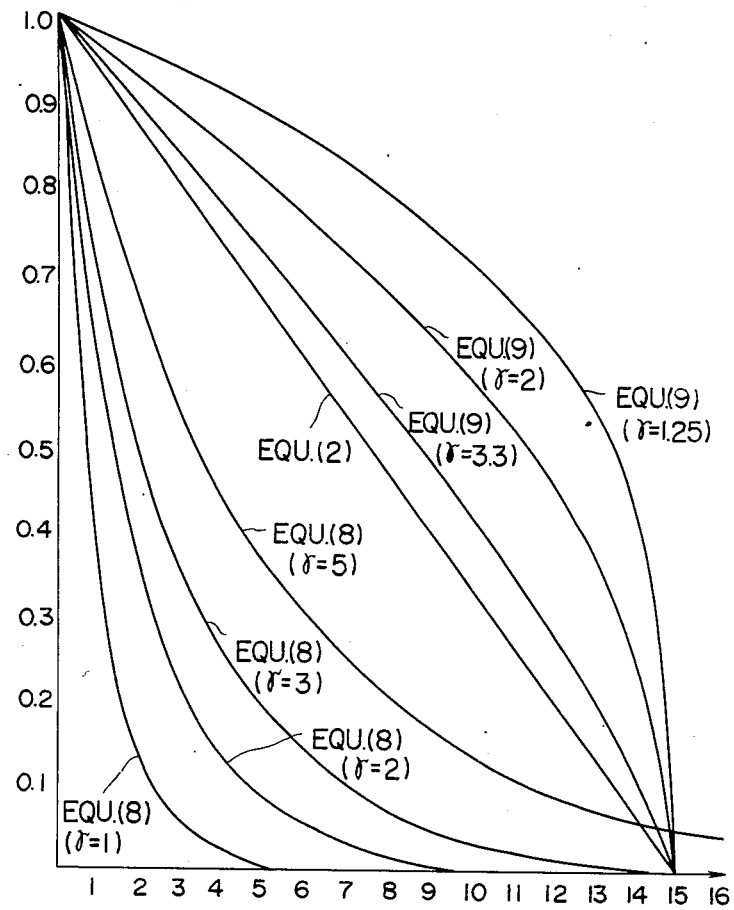
FIG. 14 is a graph showing relative correction amount curves of the respective correction or modification equations.

In this connection, FIG. 14 shows a graph representing a case in which the changes of the relative modification amounts in the respective equations in a case where the quantized level is set to the value "16" and the $\beta$ is set to the valve "15" are represented with respect to "$\alpha$". As is understood from the graph, the modification basedon the equation (2) is shown by a linear line with respect to "$\alpha$", and on the other hand, the modifications based on the equations (9) and (10) are shown by nonlinear lines with respect to "$\alpha$". The graph of FIG. 14 also shows that the inclinations of the modifications are changed by the values of "$\alpha$".

In the foregoing descriptions, although the signal conversion method is described with respect to the picture on the screen of a cathode ray tube (CRT) of a television set, it will easily be understood by those skilled in the art that the signal conversion method according to this invention can be applied for obtaining a colored hard copy from the screen of the CRT of a display unit in industrial measurements without being limited to the screen of the CRT of the television set, and moreover, applied to a color liquid crystal display unit without utilizing the CRT means.

As described hereinbefore, according to this invention, a color or colors with highly purified saturation can optionally be reproduced as occasion demands only by converting a signal regarding a picture displayed on, for example, a television screen to a received signal by using a signal converting means, so as to thereby easily obtain a color hard copy with an extremely high quality.

It should be understood that many modifications and adaptations of the invention will become apparent to those skilled in the art and it is intended to encompass such obvious modifications and changes in the scope of the claims appended hereto.

What is claimed is:

1. A method for converting color picture signals regarding a displayed color picture to obtain a color hard copy thereof comprising the steps of:
    designating a color for correction according to color hues of yellow, magenta and cyan;
    maximally correcting said designated color by changing a signal level of a specific color; and
    thereby obtaining a slow change of said correction far from said designated color.

2. A converting method as claimed in claim 1, wherein said changing is greater than a normal signal level thereof.

3. A method for converting color picture signals regarding a displayed color picture to obtain a color hard copy thereof comprising the steps of:
    preparing a signal conversion means for setting a specific color, a means for setting a specific dye amount and a means for converting input signals regarding a displayed color picture in a case where a color reproducing area of the displayed color picture is different from that of a color hard copy to be obtained;
    modifying an inclination of brightness with respect to saturation of a color of the color hard copy so as to be in accord with an inclination of brightness with respect to the saturation of a color of the displayed color picture by said signal converting means;
    changing a signal level regarding the specific color designated by said color setting means and changing a color development density of the specific dye designated by said dye amount setting means, and thereby maximally correcting said specific color.

4. A method as claimed in claim 3, further including quantizing said input signals.

5. A method as claimed in claim 3, wherein said input signals are red, green and blue signals.

* * * * *